United States Patent
Krishna et al.

(10) Patent No.: US 10,009,422 B1
(45) Date of Patent: Jun. 26, 2018

(54) BACKUP MANAGEMENT BASED ON CLIENT DEVICE STATUSES

(71) Applicant: EMC Corporation, Hopkinton, MA (US)

(72) Inventors: Vinodh Krishna, Bangalore (IN); M. Uday Kiran, Hindupur (IN); Iresha R. Gadikar, Bijapur (IN); Mahendran P. Subramanian, Bangalore (IN); Reshmee Jawed, Jamshedpur (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 277 days.

(21) Appl. No.: 14/859,550

(22) Filed: Sep. 21, 2015

(51) Int. Cl.
  *G06F 11/14* (2006.01)
  *H04L 29/08* (2006.01)
  *H04L 12/18* (2006.01)
  *G06F 17/30* (2006.01)

(52) U.S. Cl.
  CPC ...... *H04L 67/1095* (2013.01); *G06F 11/1446* (2013.01); *G06F 11/1448* (2013.01); *G06F 11/1458* (2013.01); *G06F 11/1464* (2013.01); *G06F 17/30067* (2013.01); *H04L 12/18* (2013.01); *H04L 67/16* (2013.01)

(58) Field of Classification Search
  CPC ............ G06F 11/1448; G06F 11/1451; G06F 11/1458; G06F 11/1464; G06F 11/2033; G06F 17/30575; G06F 11/1446; G06F 17/30067; H04L 12/18; H04L 12/2814; H04L 67/025; H04L 67/10; H04L 67/1095; H04L 67/16
  See application file for complete search history.

(56) References Cited

U.S. PATENT DOCUMENTS

| | | | | |
|---|---|---|---|---|
| 8,296,410 B1* | 10/2012 | Myhill | ................ | G06F 11/1464 709/223 |
| 8,732,479 B1* | 5/2014 | Henriksen | ........... | G06F 11/1464 709/201 |
| 2007/0140155 A1* | 6/2007 | Yu | ........................... | H04L 12/18 370/312 |
| 2008/0115152 A1* | 5/2008 | Welingkar | ........ | G06F 17/30575 719/322 |
| 2008/0270718 A1* | 10/2008 | Stocklein | ............ | G06F 11/1458 711/162 |
| 2009/0067441 A1* | 3/2009 | Ansari | ................ | H04L 12/2814 370/401 |
| 2013/0018946 A1* | 1/2013 | Brown | ................ | G06F 11/1451 709/203 |
| 2015/0022666 A1* | 1/2015 | Kay | ...................... | H04L 67/025 348/159 |
| 2015/0302025 A1* | 10/2015 | Apte | .................... | G06F 11/1448 707/652 |

(Continued)

*Primary Examiner* — Le H Luu
(74) *Attorney, Agent, or Firm* — Dergosits & Noah LLP; Todd A. Noah

(57) ABSTRACT

Backup management based on client device statuses is described. A system determines whether a backup operation is requested for a client device. The system determines whether a status of the client device indicates that the client device is available for the backup operation in response to a determination that the backup operation is requested for the client device. The system executes the backup operation for the client device in response to a determination that the status of the client device indicates that the client device is available for the backup operation.

20 Claims, 3 Drawing Sheets

(56) References Cited

U.S. PATENT DOCUMENTS

| | | | | |
|---|---|---|---|---|
| 2015/0350306 A1* | 12/2015 | Dryden | ................... | H04L 67/10 |
| | | | | 709/203 |
| 2016/0210209 A1* | 7/2016 | Verkaik | ............... | G06F 11/2033 |
| 2016/0364301 A1* | 12/2016 | Alatorre | .............. | G06F 11/1464 |
| 2017/0060708 A1* | 3/2017 | Narang | ............... | G06F 11/2033 |

* cited by examiner

BACKUP MANAGEMENT BASED ON CLIENT DEVICE STATUSES

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

A backup application may respond to an on-demand request received via a user interface and/or a request received from a backup schedule by initiating a backup operation for a client device. If the backup application does not have any information about the current status of the client device, a backup operation will fail when the client device is unavailable for the backup operation, such as when the client device is too busy, when communication with the client device is interrupted, or when the client device is inoperative for any reason.

Embodiments herein manage backups based on client device statuses. A determination is made whether a backup operation is requested for a client device. A determination is made whether a status of the client device indicates that the client device is available for the backup operation in response to a determination that the backup operation is requested for the client device. The backup operation is executed for the client device in response to a determination that the status of the client device indicates that the client device is available for the backup operation.

For example, a backup application determines whether a backup operation is scheduled for a laptop computer. If a backup operation is scheduled for the laptop computer, the backup application determines whether the client status of the laptop computer indicates that the laptop computer is available for the backup operation. If the client status of the laptop computer indicates that the laptop computer is available for the backup operation, the backup application executes the backup operation for the laptop computer. Therefore, the backup application overcomes the legacy problem of attempting to execute a backup operation on a client device which is unavailable for a backup operation.

Figure 1:
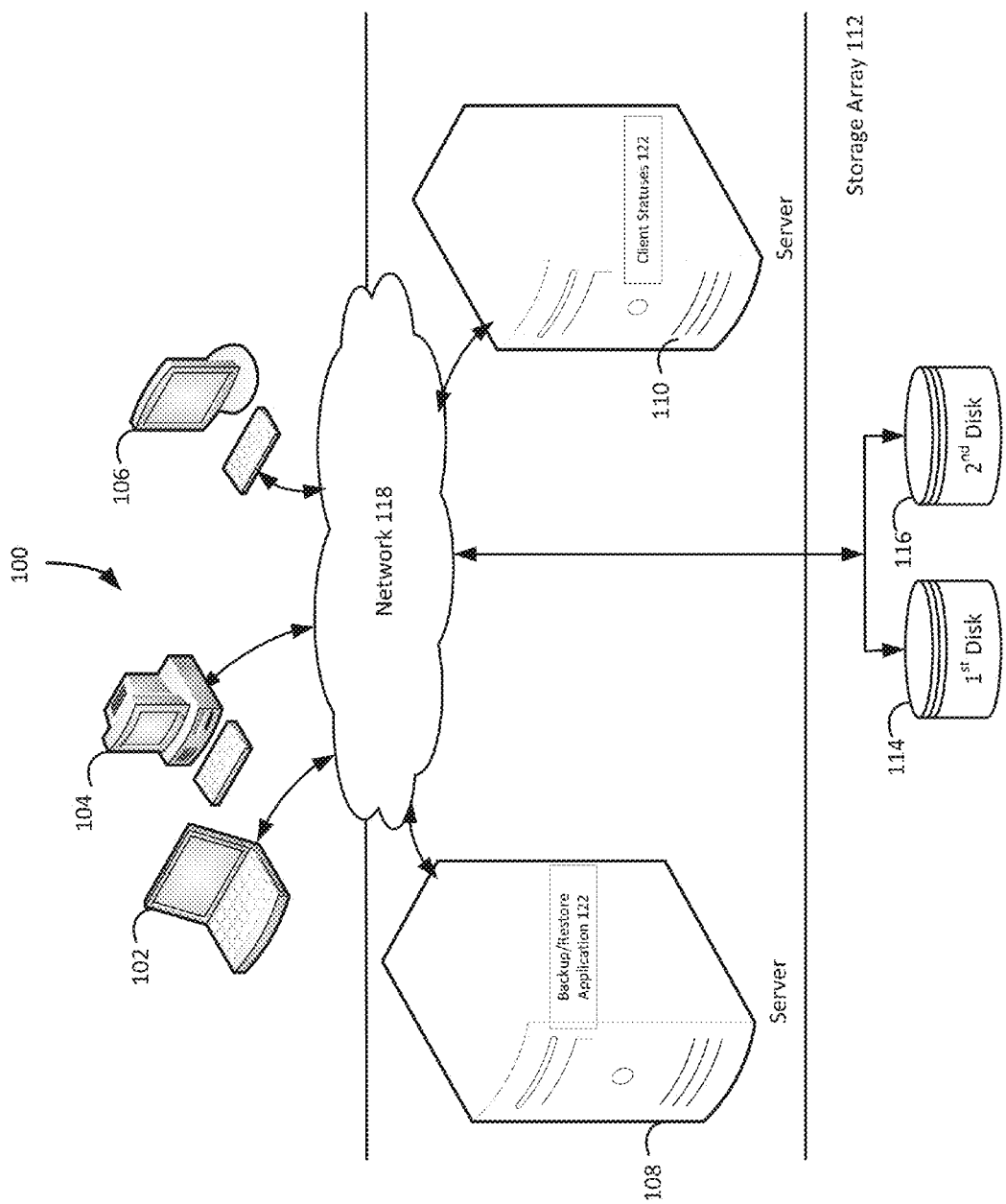
FIG. 1 illustrates a block diagram of an example system for backup management based on client device statuses, under an embodiment.

FIG. 1 illustrates a diagram of a system that implements backup management based on client device status, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108, a second server 110, and a storage array 112 that may be provided by a hosting company. Although FIG. 1 depicts the first client 102 as a laptop computer 102, the second client 104 as a personal computer 104, and the third client 106 as a server 106, each of the clients 102-106 may be any type of computer. The storage array 112 includes a first disk 114 and a second disk 116. The clients 102-106, the servers 108-110, and the storage array 112 communicate via a network 118. Although FIG. 1 depicts the system 100 with three clients 102-106, two servers 108-110, one storage array 112, two disks 114-116, and one network 118, the system 100 may include any number of clients 102-106, any number of servers 108-110, any number of storage arrays 112, any number of disks 114-116, and any number of networks 118. The clients 102-106 and the servers 108-110 may each be substantially similar to the system 300 depicted in FIG. 3 and described below.

The first server 108, which may be referred to as a backup server 108, includes a backup/restore application 120 that creates backup files of data objects for the clients 102-106, and executes a rollback based on the backup files. The backup/restore application 120 provides centralized administration, such as scheduling, monitoring, and managing backup operations and backup files. The backup/restore application 120 enables the storing of backup operation schedules, client policies, and client configurations. The backup/restore application 120 provides a unique interface to the clients 102-106 during login, and assists the backup server 108 in authenticating and registering the clients 102-106. The backup/restore application 120 sends backup/restore work orders to the clients 102-106, which receive and process the work orders to start a backup or restore operation. The backup/restore application 120 maintains a local database of all processes that execute on the backup server 108. The backup/restore application 120 executes server-side processes for a system administrator's graphical management console, which may enable the system administrator to use command line interface tools for queries. For example, a system administrator identifies the clients 102-106 registered with the backup server 108.

Although FIG. 1 depicts the backup/restore application 120 residing completely on the backup server 108, the backup/restore application 120 may reside in any combination of partially on the backup server 108 and partially on the clients 102-106. Even though the following paragraphs describe EMC Corporation's Avamar® backup/restore application and EMC Corporation's NetWorker® backup/restore application as examples of the backup/restore application 120, the backup/restore application 120 may be any other backup/restore application which provides the backup/restore functionalities described in the Background section.

The backup/restore application 120 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 120 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The second server 110, which may be referred to as a presence server 110, includes client statuses 122 that indicate the availability of the clients 102-106 for corresponding backup operations. The client statuses 122 specify whether a corresponding client device has a present status, which indicates that the corresponding client device is available for a backup operation, or whether the corresponding client device is offline, busy, or suspended, which indicates that the corresponding client device is unavailable for a backup operation.

The client statuses 122 may be maintained in a separate sever, such as the presence server 110, from the backup server 108, or maintained within the backup server 108. Additionally, the presence server 110 may maintain the client statuses 122, and broadcast the client statuses 122 to the backup server 108, which may maintain its own copy of the client statuses 122.

The presence server 110 receives the client statuses 122 from the client devices 102-106. Each of the client devices 102-106 broadcasts its own client statuses to the presence server 110. The client devices 102-106 may broadcast their own client statuses via the Extensible Messaging and Presence Protocol (XMPP) communications protocol. The XMPP communications protocol is an open standard communications protocol which is supported in a wide range of platforms. Each of the clients 102-106 may install a XMPP module which broadcasts client statuses. The presence server 110 may also receive client status by types of communications other than the XMPP communications protocol, such as Microsoft Office communications, Cisco unified communications, etc.

The presence server 110 may revise the status of a client device based on a lack of a broadcast by the client device. For example, the laptop computer 102 uses the XMPP communication protocol to broadcast a client status of present at 9:00 AM, and when the presence server 110 does not receive another client status from the laptop computer 102 by 9:10 A.M., the presence server 110 revises the client status for the laptop computer 102 from present to offline. In another example, if the laptop computer 102 goes offline, the laptop computer 102 broadcasts a client status of offline, and when the laptop computer 102 returns to online operation, the laptop computer 102 broadcasts a client status of present. In yet another example, if the laptop computer 102 determines that its current load is exceeding a capacity threshold, the laptop computer 102 broadcasts a client status of busy, and when the current load falls below the capacity threshold for a sufficient amount of time, the laptop computer 102 broadcasts a client status of present.

The backup application 120 initiates backup management by determining whether a backup operation is requested for any client device. For example, the backup application 120 determines whether a backup operation is scheduled for the laptop computer 102. If a backup operation is not requested for any client device, the backup application 120 continues checking for backup operation requests for any client device.

If a backup operation is requested for a client device, the backup application 120 determines whether a status of the client device indicates that the client device is available for the backup operation. For example, the backup application 120 determines whether the client status of the laptop computer 102 indicates that the laptop computer 102 is available for a backup operation because the backup operation is requested for the laptop computer 102.

If a status of a client device indicates that the client device is available for a backup operation, the backup application 120 executes the backup operation for the client device. For example, the backup application 120 executes a backup operation for the laptop computer 102 because the presence status of the laptop computer 102 indicates that the laptop computer 102 is available for the backup operation.

If a status of a client device indicates that the client device is not available for a backup operation, the backup application 120 can either cancel or postpone the backup operation for the client device. For example, the backup application 120 cancels a backup operation for the laptop computer 102 because the off-line status of the laptop computer 102 indicates that the laptop computer 102 is not available for the backup operation. In another example, the backup application 120 postpones a backup operation for the laptop computer 102 for one hour because the busy status of the laptop computer 102 indicates that the laptop computer 102 is temporarily unavailable for the backup operation. For this example, if the laptop computer 102 is busy performing other critical functions when a backup operation is executed for the laptop computer 102, the backup operation may not only fail, but may also cause threads and/or processes already executing in the laptop computer 102 to fail.

Figure 2:
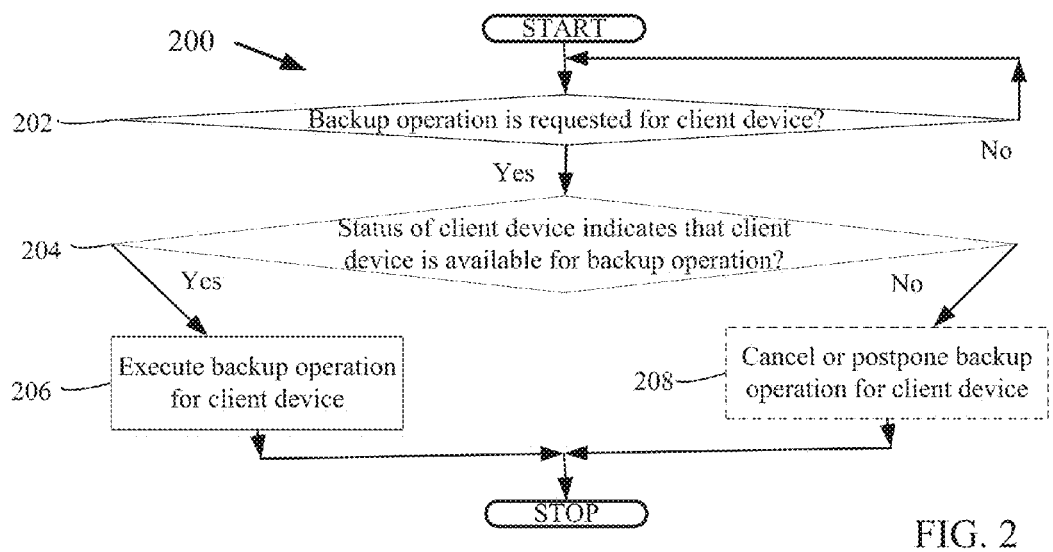
FIG. 2 is a flowchart that illustrates a method of backup management based on client device statuses, under an embodiment.

FIG. 2 is a flowchart that illustrates a method for backup management based on client device statuses, under an embodiment. Flowchart 200 illustrates method acts illustrated as flowchart blocks for certain steps involved in and/or between the clients 102-106 and/or the servers 108-110 of FIG. 1.

The backup application 120 determines whether a backup operation is requested for a client device, block 202. For example, the backup application 120 determines whether a backup operation is scheduled for the laptop computer 102. If a backup operation is requested for a client device, the flowchart 200 continues to block 204 to check the status of the client device. If a backup operation is not requested for a client device, the flowchart 200 stays at block 202 to continue checking for backup operation requests for the client device.

If a backup operation is requested for a client device, the backup application 120 determines whether a status of the client device indicates that the client device is available for the backup operation, block 204. For example, the backup application 120 determines whether the client status of the laptop computer 102 indicates that the laptop computer 102 is available for a backup operation because the backup operation is requested for the laptop computer 102. If a status of a client device indicates that the client device is available for a backup operation, the flowchart 200 continues to block 206 to execute the backup operation. If a status of a client device indicates that the client device is not available for a backup operation, the flowchart 200 proceeds to block 208 to cancel or postpone the backup operation.

If a status of a client device indicates that the client device is available for a backup operation, the backup application 120 executes the backup operation for the client device, block 206. For example, the backup application 120 executes a backup operation for the laptop computer 102 because the present status of the laptop computer 102 indicates that the laptop computer 102 is available for the backup operation. Then the flowchart 200 terminates.

If a status of a client device indicates that the client device is not available for a backup operation, the backup application 120 may optionally either cancel the backup operation for the client device or postpone the backup operation for the client device, block 208. For example, the backup application 120 cancels a backup operation for the laptop computer 102 because the off-line status of the laptop computer 102 indicates that the laptop computer 102 is not available for the backup operation. Then the flowchart 200 terminates.

Although FIG. 2 depicts the blocks 202-208 occurring in a specific order, the blocks 202-208 may occur in another order. In other implementations, each of the blocks 202-208 may also be executed in combination with other blocks and/or some blocks may be divided into a different set of blocks.

Figure 3:
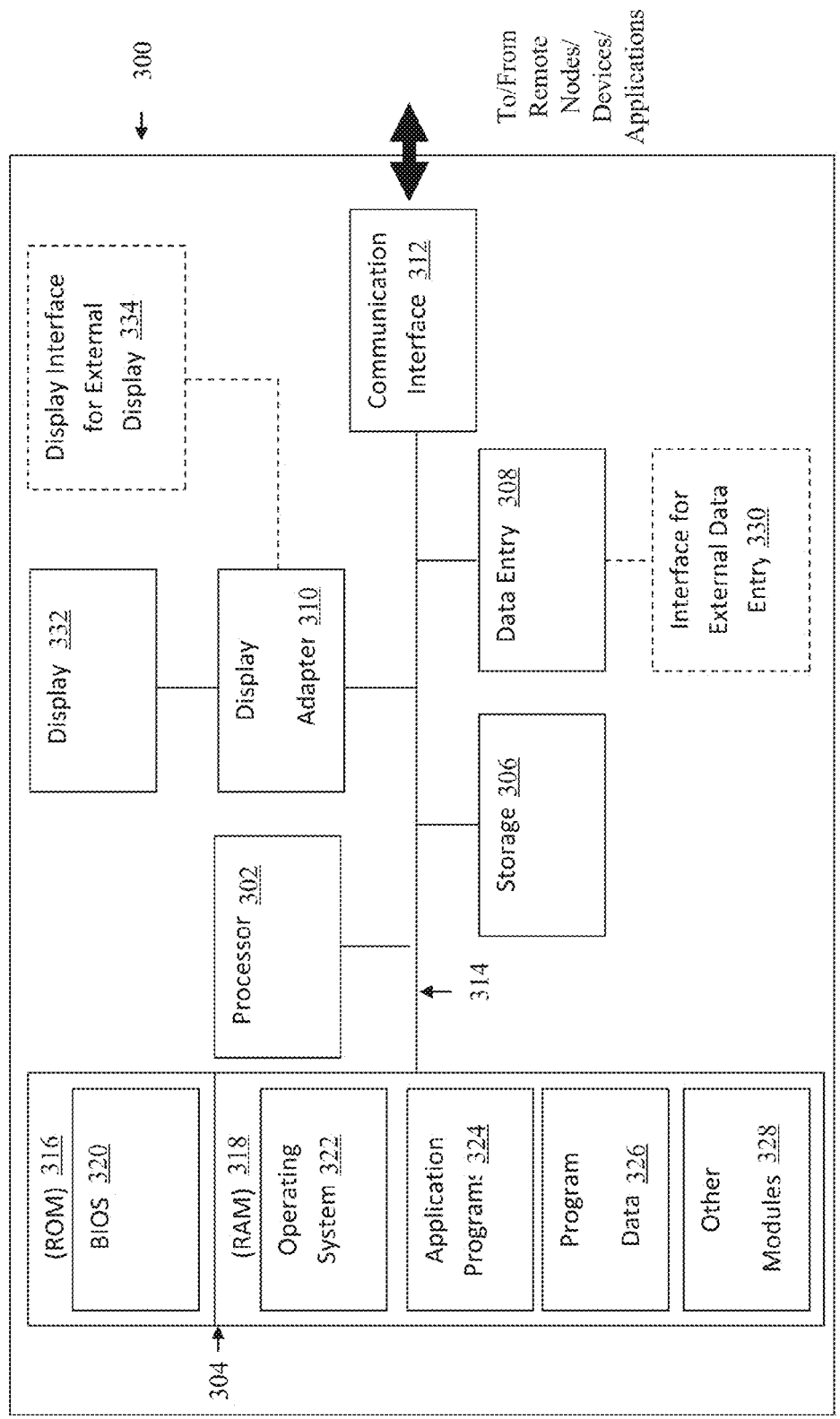
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
a processor-based application stored on a non-transitory computer-readable medium, which when executed on a computer, will cause one or more processors to:
determine whether a backup operation is requested for a client device;
determine whether a current status of the client device indicates that the client device is available for the backup operation based on a plurality of client statuses for a plurality of client devices stored on the computer, the determination being in response to a determination that the backup operation is requested for the client device; and
execute the backup operation for the client device in response to a determination that the status of the client device indicates that the client device is available for the backup operation.

2. The system of claim 1, wherein the backup operation is requested for the client device based on at least one of an on-demand request via a user interface and a backup schedule.

3. The system of claim 1, wherein the status of the client device is broadcast by the client device.

4. The system of claim 3, wherein the broadcast is via the Extensible Messaging and Presence Protocol (XMPP) communications protocol.

5. The system of claim 1, wherein the status of the client device is revised based on a lack of a broadcast by the client device.

6. The system of claim 1, wherein the status of the client device specifies that the client device is unavailable for the backup operation when the client device is one of offline, busy, and suspended.

7. The system of claim 1, wherein the processor-based application further causes the processor to one of cancel the backup operation for the client device and postpone the backup operation for the client device in response to a determination that the status of the client device indicates that the client device is not available for the backup operation.

8. A the method comprising:
determining, by a backup server, whether a backup operation is requested for a client device;
determining, by the backup server, whether a current status of the client device indicates that the client device is available for the backup operation based on a plurality of client statuses for a plurality of client devices stored on the backup server, the determination being in response to a determination that the backup operation is requested for the client device;
executing, by the backup server, the backup operation for the client device in response to a determination that the status of the client device indicates that the client device is available for the backup operation.

9. The method of claim 8, wherein the backup operation is requested for the client device based on at least one of an on-demand request via a user interface and a backup schedule.

10. The method of claim 8, wherein the status of the client device is broadcast by the client device, and wherein the broadcast is via the Extensible Messaging and Presence Protocol (XMPP) communications protocol.

11. The method of claim 8, wherein the status of the client device is revised based on a lack of a broadcast by the client device.

12. The method of claim 8, wherein the status of the client device specifies that the client device is unavailable for the backup operation when the client device is one of offline, busy, and suspended.

13. The method of claim 8, wherein the method further comprises one of canceling the backup operation for the client device and postponing the backup operation for the client device in response to a determination that the status of the client device indicates that the client device is not available for the backup operation.

14. A computer program product, comprising a non-transitory computer-readable medium having a computer-readable program code embodied therein to be executed by one or more processors, the program code including instructions to:
determine whether a backup operation is requested for a client device;
determine whether a current status of the client device indicates that the client device is available for the backup operation based on a plurality of client statuses for a plurality of client devices stored on a presence server, the determination being in response to a determination that the backup operation is requested for the client device; and
execute the backup operation for the client device in response to a determination that the status of the client device indicates that the client device is available for the backup operation.

15. The computer program product of claim 14, wherein the backup operation is requested for the client device based on at least one of an on-demand request via a user interface and a backup schedule.

16. The computer program product of claim 14, wherein the status of the client device is broadcast by the client device.

17. The computer program product of claim 16, wherein the broadcast is via the Extensible Messaging and Presence Protocol (XMPP) communications protocol.

18. The computer program product of claim 14, wherein the status of the client device is revised based on a lack of a broadcast by the client device.

19. The computer program product of claim 14, wherein the status of the client device specifies that the client device is unavailable for the backup operation when the client device is one of offline, busy, and suspended.

20. The computer program product of claim 14, wherein the program code includes further instructions to one of cancel the backup operation for the client device and postpone the backup operation for the client device in response to a determination that the status of the client device indicates that the client device is not available for the backup operation.

* * * * *